(12) United States Patent
Brewer et al.

(10) Patent No.: US 11,960,768 B2
(45) Date of Patent: Apr. 16, 2024

(54) MEMORY-SIDE CACHE DIRECTORY-BASED REQUEST QUEUE

(71) Applicant: Micron Technology, Inc., Boise, ID (US)

(72) Inventors: Tony M. Brewer, Plano, TX (US); Dean E. Walker, Allen, TX (US)

(73) Assignee: Micron Technology, Inc., Boise, ID (US)

( * ) Notice: Subject to any disclaimer, the term of this patent is extended or adjusted under 35 U.S.C. 154(b) by 49 days.

(21) Appl. No.: 17/823,391

(22) Filed: Aug. 30, 2022

(65) Prior Publication Data

US 2024/0069801 A1 Feb. 29, 2024

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC ..... G06F 3/0659; G06F 3/0604; G06F 3/0679
USPC ........................................................ 711/154
See application file for complete search history.

(56) References Cited

U.S. PATENT DOCUMENTS

| 2005/0018618 | A1* | 1/2005 | Mualem | H04L 63/1458 709/224 |
| 2015/0293699 | A1* | 10/2015 | Bromley | G06F 3/0629 711/161 |
| 2019/0215021 | A1* | 7/2019 | Frishman | H03M 13/09 |
| 2022/0358046 | A1* | 11/2022 | Favor | G06F 12/0811 |

* cited by examiner

*Primary Examiner* — Than Nguyen
(74) *Attorney, Agent, or Firm* — Schwegman Lundberg & Woessner, P.A.

(57) ABSTRACT

Systems and techniques for a memory-side cache directory-based request queue are described herein. A memory request is received at an interface of a memory device. One or more fields of the memory request are written into an entry of a directory data structure. The identifier of the entry is pushed onto a queue. To perform the memory request, the identifier is popped off of the queue and a field of the memory request is retrieved from the entry of the directory data structure using the identifier. Then, a process on the memory request can be performed using the field retrieved from the entry of the directory data structure.

24 Claims, 7 Drawing Sheets

| | | | |
|---|---|---|---|
| | | CACHE LINE | WAY 0 TAG + DATA — 425 |
| 405 | CACHE SET 0 (ADDRESS 00XXXX) | CACHE LINE | WAY 1 TAG + DATA — 430 |
| | | CACHE LINE | WAY 2 TAG + DATA — 435 |
| | | CACHE LINE | WAY 3 TAG + DATA — 440 |
| | | CACHE LINE | WAY 0 TAG + DATA |
| 410 | CACHE SET 1 (ADDRESS 01XXXX) | CACHE LINE | WAY 1 TAG + DATA |
| | | CACHE LINE | WAY 2 TAG + DATA |
| | | CACHE LINE | WAY 3 TAG + DATA |
| | | CACHE LINE | WAY 0 TAG + DATA |
| 415 | CACHE SET 2 (ADDRESS 10XXXX) | CACHE LINE | WAY 1 TAG + DATA |
| | | CACHE LINE | WAY 2 TAG + DATA |
| | | CACHE LINE | WAY 3 TAG + DATA |
| | | CACHE LINE | WAY 0 TAG + DATA |
| 420 | CACHE SET 3 (ADDRESS 11XXXX) | CACHE LINE | WAY 1 TAG + DATA |
| | | CACHE LINE | WAY 2 TAG + DATA |
| | | CACHE LINE | WAY 3 TAG + DATA |

MEMORY-SIDE CACHE DIRECTORY-BASED REQUEST QUEUE

STATEMENT REGARDING GOVERNMENT SUPPORT

This invention was made with Government support under Agreement No. DE-NA0003525, awarded by SANDIA II. The Government has certain rights in the invention.

TECHNICAL FIELD

Embodiments described herein generally relate to computer memory and more specifically to a memory-side cache directory-based request queue.

BACKGROUND

Memory devices for computers or other electronic devices can be categorized as volatile and non-volatile memory. Volatile memory uses power to maintain its data (e.g., is periodically refreshed), and includes random-access memory (RAM), dynamic random-access memory (DRAM), or synchronous dynamic random-access memory (SDRAM), among others. Non-volatile memory generally retains stored data in the absence of a power source, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magnetoresistive random-access memory (MRAM), among others. Persistent memory is an architectural property of the system where the data stored in the media is available after system reset or power-cycling. In an example, non-volatile memory media can be used to build a system with a persistent memory model.

Memory devices can be coupled to a host (e.g., a host computing device) to store data, commands, or instructions for use by the host while the computer or electronic system is operating. For example, data, commands, or instructions can be transferred between the host and the memory device during operation of a computing or other electronic system.

Various protocols or standards can be applied to facilitate communication between a host and one or more other devices such as memory buffers, accelerators, or other input/output devices. In an example, an unordered protocol, such as Compute Express Link (CXL), can be used to provide high-bandwidth and low-latency connectivity.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Compute Express Link (CXL) is an open standard interconnect configured for high-bandwidth, low-latency connectivity between host devices and other devices such as accelerators, memory buffers, or smart input-output (I/O) devices. CXL was designed to facilitate high-performance computational workloads by supporting heterogeneous processing and memory systems. CXL provides memory semantics and mechanisms for cache coherency on top of PCI Express (PCIe)-based I/O semantics for optimized performance.

CXL can be used in applications such as artificial intelligence, machine learning, analytics, cloud infrastructure, edge computing devices, communication systems, and elsewhere, to provide flexible connectivity to memory or accelerators for a host processor platform. Data processing in such applications can use various scalar, vector, matrix, or spatial architectures that can be deployed in CPU, GPU, FPGA, smart NICs, or other accelerators that can be coupled using a CXL link. Near memory accelerators, in which an accelerator is collocated with memory, provide low latency processing while expanding system capabilities.

CXL supports dynamic multiplexing using a set of protocols that includes I/O (CXL.io, based on PCIe), caching (CXL.cache), and memory (CXL.memory) semantics. In an example, CXL can be used to maintain a unified, coherent memory space (e.g., cache coherence) between the CPU (e.g., a host device or host processor) and any memory managed (e.g., at) the CXL device. This configuration enables the CPU and other device to share resources and operate on the same memory region for higher performance, reduced data-movement, and reduced software stack complexity. In an example, the CPU is primarily responsible for maintaining or managing coherency in a CXL environment. Accordingly, CXL can be leveraged to help reduce device cost and complexity, as well as overhead traditionally associated with coherency across an I/O link.

While CXL protocols enable memory coherency, the implementation of the coherency mechanism can take several forms. When near-memory computation—such as by a near-memory accelerator, or an atomic memory operation (AMO) perform by an atomic memory unit (AMU)—memory coherency signaling can become complicated. In general, host-based CXL requests cannot be indeterminately held, waiting for an internal (e.g., atomic) operation to complete. In such circumstances, the CXL device (e.g., memory, accelerator, etc.) tracks requests including from where the requests originate (e.g., external CXL requests or internal accelerator requests). Internal memory, such as queues or buffers, can proliferate to track a variety of requests, request originators, or processing state of requests in order to properly track requests and comply with CXL.

The examples illustrated herein generally portray a CXL memory device with a cache fronting backing memory managed by the CXL memory device. The memory can be included in the CXL memory device or connected to the CXL memory device. In either case, however, the memory is accessed through the cache. The cache used in these examples is an n-way associative cache. Cache lines in a cache set for an address association are used to hold data being read from or written to a memory address that is in a range corresponding to the cache set. With respect to CXL memory coherency, such a cache structure results in another level of complexity that is managed by the CXL device at the benefit of generally lower latency and higher performance memory access.

A high-performance cache services multiple simultaneous requests. Here, each request can be in a different state of completion. The state of an entire request can be passed through various queues as the request progress from arrival to completion in the CXL memory device. Passing the entire request state from one processing point to another results in significant storage for the requests at the various processing pipeline queues as well as internal CXL memory device bandwidth to transfer the request state between these queues.

To address the storage and bandwidth issue of transferring request state between pipeline stages in a CXL device, the CXL device includes a central request directory to store requests state information. The directory includes entries for the requests and identifiers (e.g., indices) that correspond to the entries. After a request is received and stored in an entry of the directory, the identifier for that entry is used to represent the request in any of the various processing pipeline queues. Thus, only the identifier is stored and passed between the queues within the CXL device. If a processing pipeline stage uses some piece of the request state information, such as the command or a memory address in the request, the pipeline stage uses the identifier to retrieve the entry and extract the request information state being used in the pipeline stage. As a result, only a single copy of the request state is maintained, and a single index is passed through queues instead of the entire requests state. This arrangement greatly reduces overall storage for request state and minimizes the internal CXL device bandwidth used to move the request state from one processing point to the next. Additional details and examples are provided below.

Figure 1:
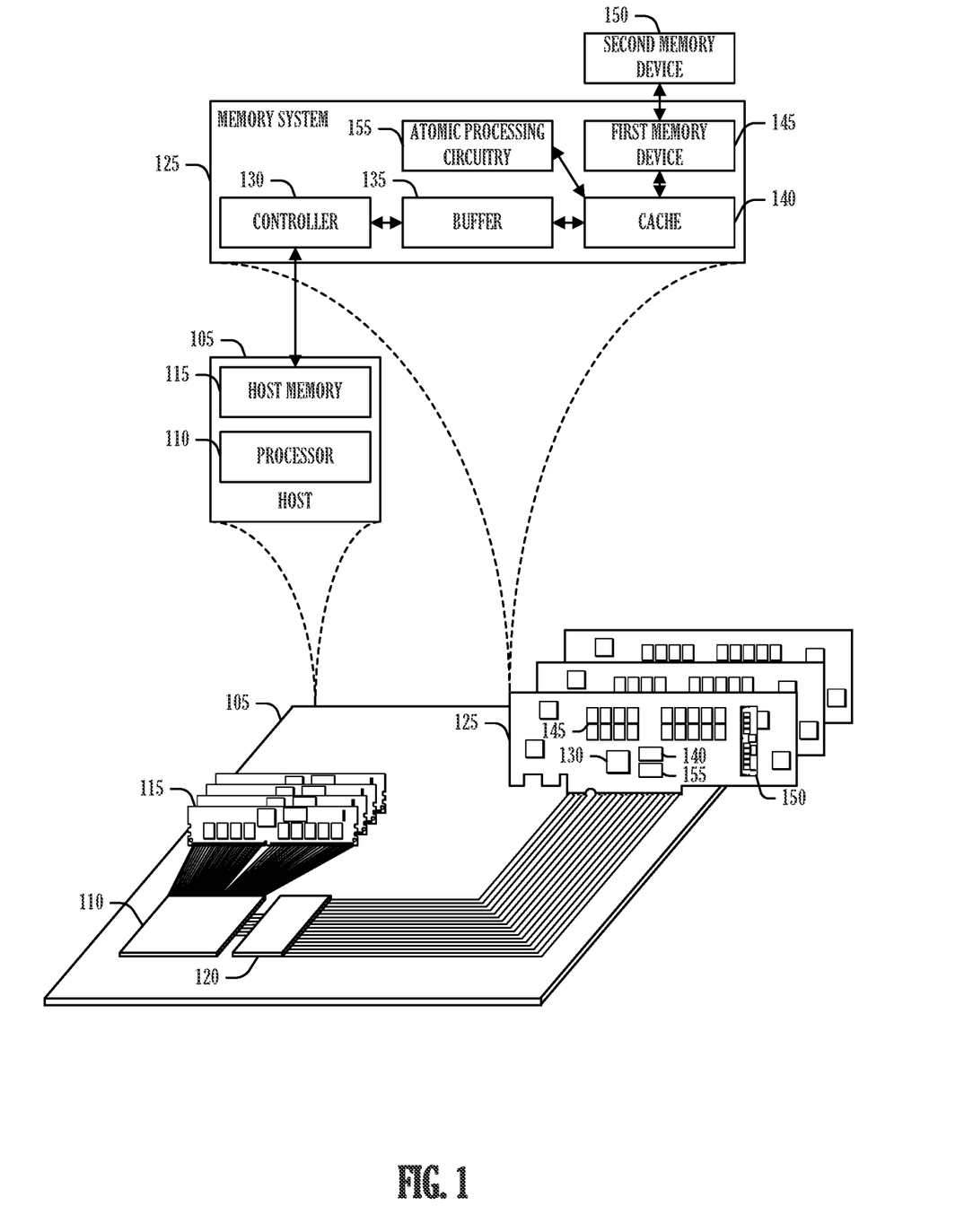
FIG. 1 illustrates an example of an environment including a system for a memory-side cache directory-based request queue, according to an embodiment.

FIG. 1 illustrates an example of an environment including a system for a memory-side cache directory-based request queue, according to an embodiment. The system includes a host device 105 and a memory system 125. The host device 105 includes processor 110 (e.g., a central processing unit (CPU)) and host memory 115. In an example, the host device 105 is, or is part of, a host system such as a server computer, workstation, personal laptop computer, a desktop computer, a digital camera, a smart phone, a memory card reader, or Internet-of-thing enabled device, among others. The processor 110 can include one or more processor cores, a system of parallel processors, or other CPU arrangements.

The memory system 125 includes a controller 130, a buffer 135 (e.g., internal state memory), a cache 140, and a first memory device 145. The first memory device 145 can include, for example, one or more memory modules (e.g., single in-line memory modules, dual in-line memory modules, etc.). The first memory device 145 can include volatile memory or non-volatile memory. The first memory device 145 can include a multiple-chip device that comprises one or multiple different memory types or modules. In an example, the system includes a second memory device 150 that interfaces with the memory system 125 and the host device 105.

The host device 105 can include a system backplane and can include a number of processing resources (e.g., one or more processors, microprocessors, or some other type of controlling circuitry). The system can optionally include separate integrated circuits for the host device 105, the memory system 125, the controller 130, the buffer 135, the cache 140, the first memory device 145, the second memory device 150, any one or more of which can comprise respective chiplets that can be connected and used together. In an example, the system includes a server system or a high-performance computing (HPC) system or a portion thereof. Embodiments of the host device 105 can be implemented in Von Neumann or in non-Von Neumann architectures, which can include one or more components (e.g., CPU, ALU, etc.) often associated with a Von Neumann architecture, or can omit these components.

In an example, the first memory device 145 can provide a main memory for the system, or the first memory device 145 can comprise accessory memory or storage for use by the system. In an example, the first memory device 145 or the second memory device 150 includes one or more arrays of memory cells, e.g., volatile or non-volatile memory cells. The arrays can be flash arrays with a NAND architecture, for example. Embodiments are not limited to a particular type of memory device. For instance, the memory devices can include RAM, ROM, DRAM, SDRAM, PCRAM, RRAM, and flash memory, among others.

In embodiments in which the first memory device 145 includes persistent or non-volatile memory, the first memory device 145 can include a flash memory device such as a NAND or NOR flash memory device. The first memory device 145 can include other non-volatile memory devices such as non-volatile random-access memory devices (e.g., NVRAM, ReRAM, FeRAM, MRAM, PCM). Some memory devices—such as a ferroelectric RAM (FeRAM) devices that include ferroelectric capacitors—can exhibit hysteresis characteristics, such as a 3-D Crosspoint (3D XP) memory device, or combinations thereof.

In an example, the interface 120 can include any type of communication path, bus, interconnect, or the like, that enables information to be transferred between the processor 110, or other devices of the host device 105, and the memory system 125. Non-limiting examples of interfaces can include a peripheral component interconnect (PCI) interface, a peripheral component interconnect express (PCIe) interface, a serial advanced technology attachment (SATA) interface, a Universal Serial Bus (USB) interface, a Thunderbolt interface, or a miniature serial advanced technology attachment (mSATA) interface, among others. In an example, the interface 120 includes a PCIe 5.0 interface that is compliant with the compute express link (CXL) protocol standard. Accordingly, in some embodiments, the interface 120 supports transfer speeds of at least 32 GT/s.

CXL is a high-speed central processing unit (CPU)-to-device and CPU-to-memory interconnect designed to enhance compute performance. CXL maintains memory coherency between the CPU memory space (e.g., the host memory 115 or caches maintained by the processor 110) and memory on attached devices or accelerators (e.g., the first memory device 145 or the second memory device 150). This arrangement enables resource sharing at higher performance, reduced software stack complexity, and lower overall system cost than other interconnect arrangements. CXL is an industry open standard interface for high-speed communications to accelerators that are increasingly used to complement CPUs in support of emerging data-rich and compute-intensive applications such as artificial intelligence and machine learning.

In an example, the controller 130 comprises a media controller such as a non-volatile memory express (NVMe) controller. The controller 130 can be configured to perform operations such as copy, write, read, error correct, etc. for the first memory device 145. In an example, the controller 130 can include purpose-built circuitry or instructions to perform various operations. That is, in some embodiments, the controller 130 can include circuitry or can be configured to perform instructions to control movement of data or addresses associated with data such as among the buffer 135, the cache 140, or the first memory device 145 or the second memory device 150.

In an example, at least one of the processor 110 or the controller 130 comprises a command manager (CM) for the memory system 125. The CM can receive, such as from the host device 105, a read command for a particular logic row address in the first memory device 145 or the second memory device 150. In an example, the CM can determine that the logical row address is associated with a first row based at least in part on a pointer stored in a register of the controller 130. In an example, the CM can receive, from the host device 105, a write command for a logical row address, and the write command can be associated with second data. In an example, the CM can be configured to issue, to non-volatile memory and between issuing the read command and the write command, an access command associated with the first memory device 145 or the second memory device 150. In an example, the CM can issue, to the non-volatile memory and between issuing the read command and the write command, an access command associated with the first memory device 145 or the second memory device 150.

In an example, the buffer 135 comprises a data buffer circuit that includes a region of a physical memory used to temporarily store data, for example, while the data is moved from one place to another. The buffer 135 can include a first-in, first-out (FIFO) queue in which the oldest (e.g., the first-in) data is processed first. In some embodiments, the buffer 135 includes a hardware shift register, a circular buffer, or a list.

In an example, the cache 140 comprises a region of a physical memory used to temporarily store particular data from the first memory device 145 or the second memory device 150. Generally, the cache provides faster access to data than the backing memories. The cache 140 can include a pool of data entries. In an example, the cache 140 can be configured to operate according to a write-back policy in which data is written to the cache without the being concurrently written to the first memory device 145. Accordingly, in some embodiments, data written to the cache 140 does not have a corresponding data entry in the first memory device 145. This can occur when, for example, data is written to the cache and deleted before a write-back is triggered to write the data into the first memory device 145, for example.

Figure 4:
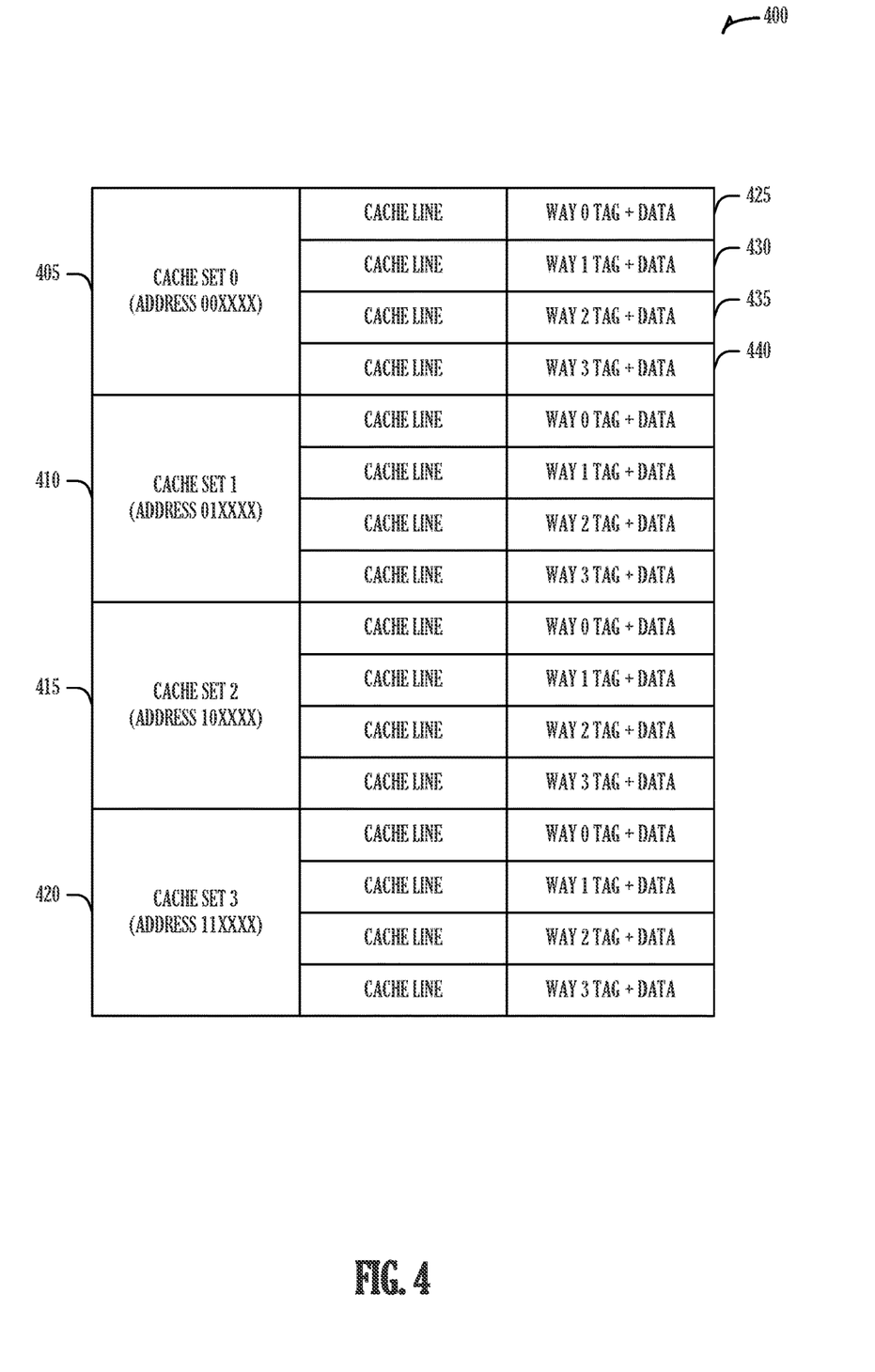
FIG. 4 illustrates an example of an associative cache, according to an embodiment.

In an example, the cache 140 is implemented as a multi-way associative cache. Here, cache entries are divided by some portion of a memory address (e.g., a set number of significant bits). A group of cache entries (e.g., cache lines or ways), called a cache set herein, can be co-associated with a same bit-set from the memory address. Usually, the number of ways in a cache set is less than the total number of memory addresses to which the ways are associated. Thus, a way can be evicted to be associated with a new memory address in the range at various points. FIG. 4 illustrates some elements of this type of associate cache.

In an example, the controller 130 can receive write requests involving the cache 140 and cause data associated with each of the write requests to be written to the cache 140. The controller 130 can similarly receive read requests and cause data that is stored in, for example, the first memory device 145 or the second memory device 150, to be retrieved and written to, for example, the host device 105 via the interface 120. In an example, the controller 130 processes all requests for memory it controls through the cache 140. Thus, a read request will first check the cache 140 to determine if the data is already cached. If not, a read to the first memory device 145 is made to retrieve the data. The data is then written to the cache 140. In an example, the data is then read from the cache 140 and transmitted to the processor 110. Working exclusively through the cache can simplify some elements of the controller 130 hardware at the cost of a little latency.

Figure 3:
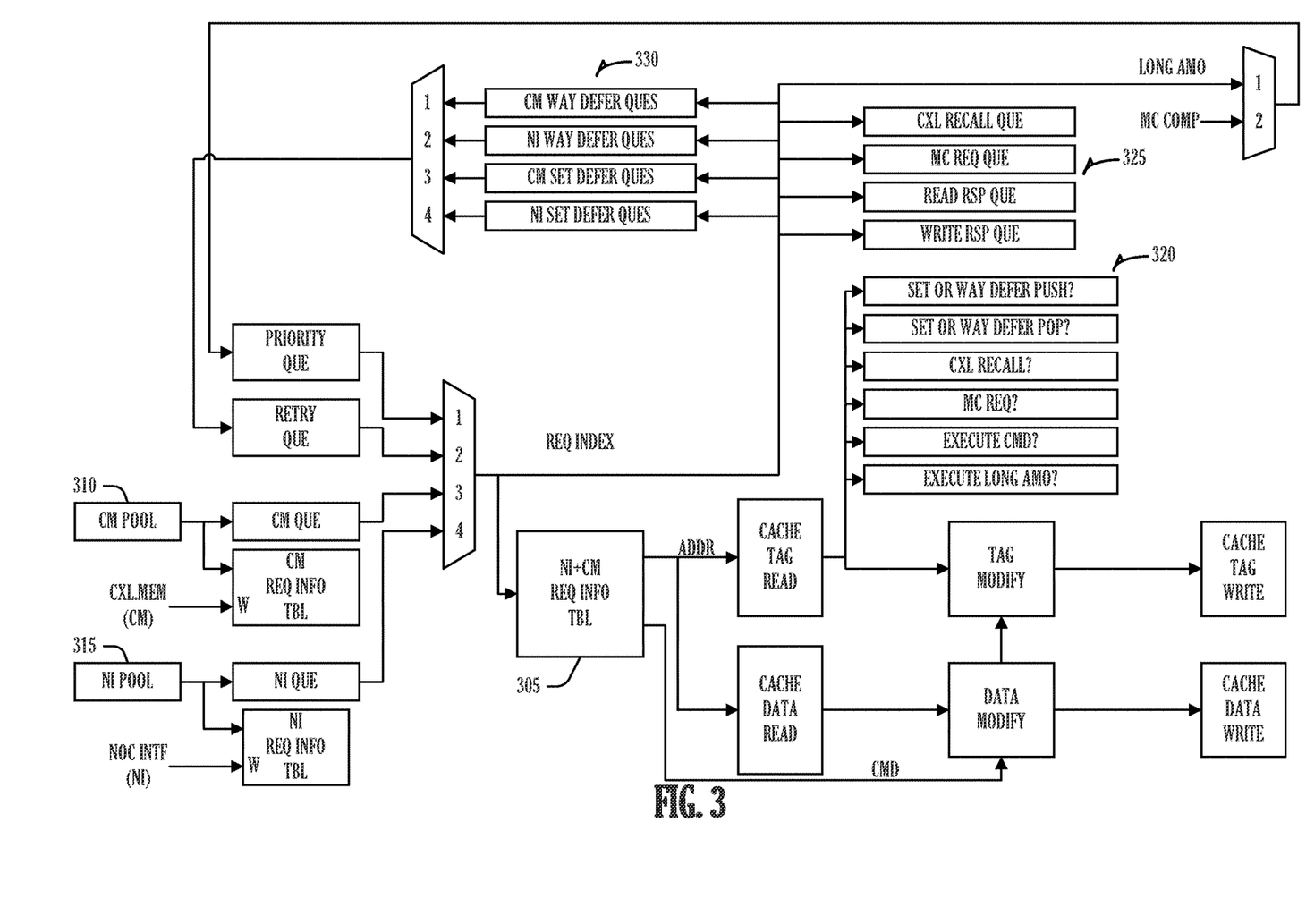
FIG. 3 illustrates example components of a memory device, according to an embodiment.
Figure 5:
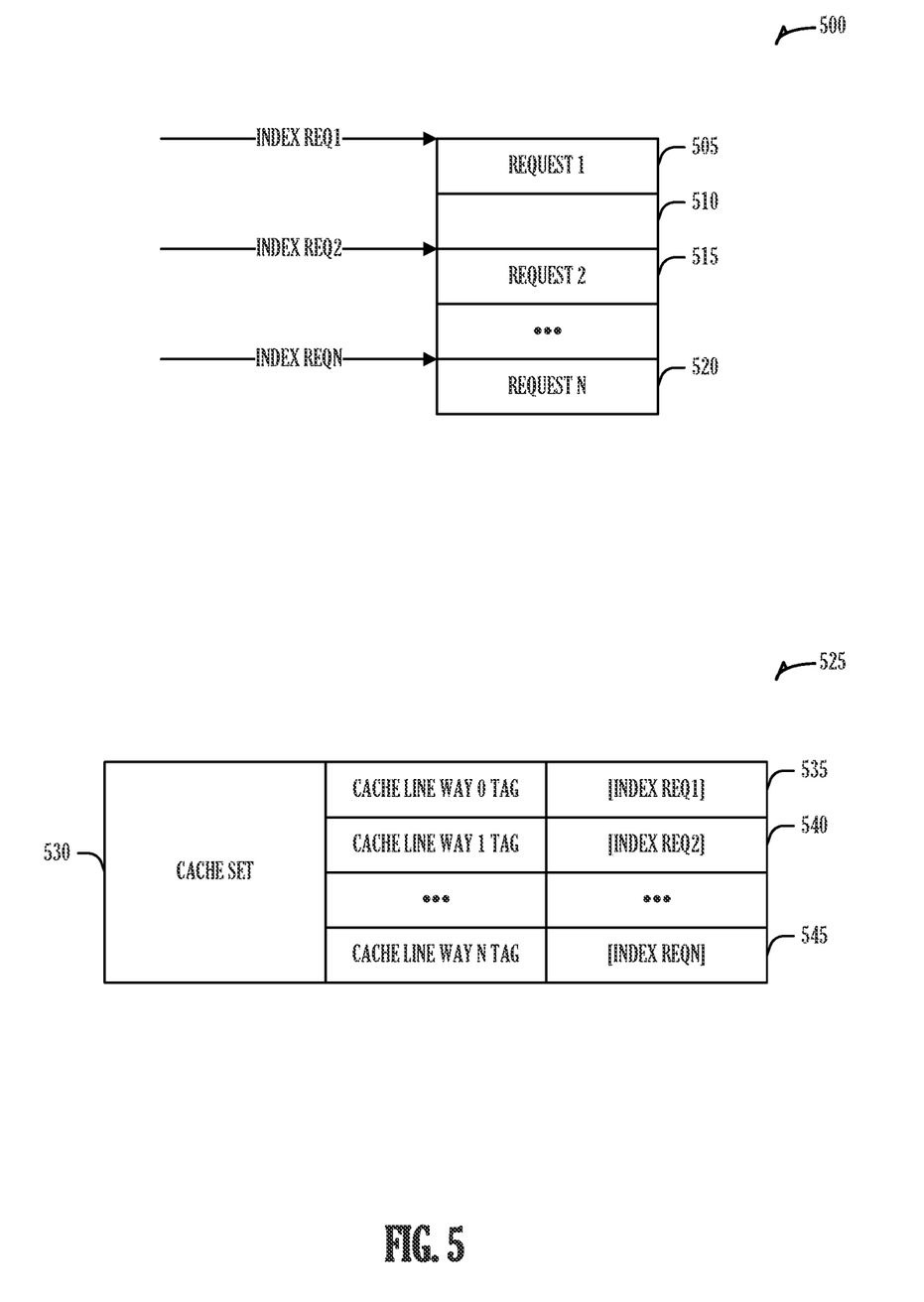
FIG. 5 illustrates an example of a memory including a directory for memory requests and cache tags pointing to entries in the directory, according to an embodiment.

As mentioned above, maintaining cache coherency in a CXL device, including one with an on-board accelerator (e.g., near-memory accelerator) such as an AMU, can entail numerous queues at numerous processing points in the CXL device. FIG. 3 illustrates an example of some of this complexity to maintain state between requests from a CXL interface or internal interface in an associative cache. Also as mentioned above, a central repository (e.g., a directory data structure) is used to hold request details rather than shipping the request state amongst the various queues. Rather, the identifier of a request entry in the directory data structure is used in the various queues. FIG. 5 illustrates an example of the directory data structure as well as the use of the identifier (e.g., index) in cache line tag data.

To implement a memory-side cache directory-based request queue, the controller 130 is configured to receive a memory request. In an example, the memory request is received at a CXL interface of the memory system 125. Such a request is also referred to as an external request in the following examples. In an example, the memory request is received at a network-on-chip (NOC) interface or other interface of the memory system 125. Such requests are also referred to internal requests. In general, the memory system 125 has only the CXL interface through which it is controlled or used. The other interfaces (e.g., NI interfaces) are either within the memory system 125 or a mechanism by which the memory device controls other hardware (e.g., the second memory device 150 as illustrated). The distinction between internal and external requests can implicate different processing (e.g., priority or handling) mechanisms to comply with the generally subordinate nature of the memory system 125 with respect to devices using the external interface (e.g., the host processor 110).

Once the memory request is received, the controller 130 is configured to write one or more fields of the memory request into an entry of the directory data structure. Here, the entry includes an identifier. For example, if the directory data structure is organized as an array, the identifier is an index for the entry. If the directory data structure is arranged as HashMap, the identifier is a hash key for the map. In an example, the identifier is unique with respect to the entry, but not with respect to the memory request. Thus, the identifier can be reused for different memory requests if the different memory requests are stored in the same entry at different points in time.

In an example, the directory data structure is a contiguous memory region divided into equal sized entries. In an example, identifiers of entries in the directory data structure are indices to the entries. In an example, the directory data structure has a static (unchanging) number of entries. In such an arrangement, empty (e.g., available) entries, can be interspersed between filled (e.g., used) entries as requests can complete out-of-order from arrival to the memory system 125. In an example, a free list of entries in the directory data structure is maintained. Here, a bitmap of the entries can be used to mark when an entry is in use, for example, by setting a logical one at an index of the bitmap that is the same as the index of the entry in the directory data structure. An empty entry is then denoted by a logical zero at the index of the empty entry.

In an example, writing the one or more fields of the memory request into the entry of the directory data structure includes obtaining the entry as a next-free entry from the free list, and removing the entry from the free list of entries in the directory data structure. As noted above, the removal of the entry from the free list can include setting a bitmap bit to a logical one. In an example, the free list is a queue in which the available entries are popped (e.g., removed from the queue) when being used and pushed (e.g., added to the queue) when freed.

Except for an initial state, in which all directory data structures are generally free, an entry is added to the free list when the request stored in the entry completes. Thus, in an example, the controller 130 is configured to, upon completion of the memory request, clear the one of more fields from the entry in in the directory data structure. The controller 130 is configured to then add the entry to the free list of entries in the directory data structure once the one of more fields are cleared from the entry. In an example, to clear the one of more fields, the fields are set to an initial state, such as all logical zeros. In an example, the entire entry is cleared by simply putting the entry on the free list. In this case, the memory request state information will be available in the directory data structure until it is overwritten by a new memory request. Explicitly bringing the directory entry to a known base state (e.g., all zeros) involves additional work by the controller 130 with a benefit of consistent data states. To clear the one of more entries by putting the entry on the free list, is an efficient technique that is appropriate when it is unlikely that any processing point will look for state data in the directory entry after the entry is moved to the free list and before the entry is used by a second request.

In an example, the directory data structure is associated with the interface. Here, the directory data structure can include a field in entries to indicate whether the request arrive on an external interface or on an internal interface. In an example, the memory device has a different directory data structure for each interface of the memory system 125. Tracking upon which interface a request arrived enables interface specific processing at processing points within the controller 130. As illustrated in FIG. 3, such interface specific processing can be managed by selective queuing of requests at the various pipeline stages.

In an example, entries to the directory data structure include fields of a request state. The one or more fields of the entry can include an address. This address is a memory address. The address can be singular, such as is typical in a memory write, or multiple addresses. Multiple address can be enumerated or expressed as a range. In the case of a range, a first and second memory address can be used to denote the start and end of the range. In an example, a memory address and an extent can be used to express the address range. The extent specifies a number of units (e.g., memory words) after the address that comprise the range.

In an example, the one or more fields of the entry include a request type. The request type can be called a command, such as a read, a write, or execution of an AMO or other accelerator command. In an example, the one or more fields include a size of the request. The size can be expressed in bits, bytes, words, or other measurement in use by the controller 130. In an example, the one or more fields of the entry include a byte enable or a payload for a write request. In an example, the one or more fields of the entry can include atomic data for an AMO request. In an example, the one or more fields of the entry can include an AMO for an AMO request. Here, the AMO is one of several implemented by the atomic processing circuitry 155 (e.g., AMU). In an example, the one or more fields of the entry include a CXL memory operation or a CXL meta state. The CXL meta state is defined by CXL and used to coordinate between the host processor 110 and the memory system 125.

Once the entry is written for the request into the directory data structure, the controller 130 is configured to push the identifier onto a queue. As noted above, the queue is used to manage requests within different processing points within the controller 130. In an example, the queue is a request queue. In an example, the queue is a response queue. In an example, the queue is a defer queue. A defer queue indicates a request that is waiting to proceed until a condition is met. Example situations in which a defer queue is used can include waiting for a cache line to be evicted in order to hold the result of the request (e.g., in the case of a read or AMO) or to hold a payload of the request (e.g., in the case of a write). In an example, the queue is a priority queue. In an example, the queue is a retry queue. In an example, the queue is associated with the interface upon which the request was received (e.g., either the internal interface or the external interface).

The controller 130 is configured to pop the identifier off of the queue to perform a process on the memory request. For example, an execute command queue can store commands waiting to execute. When the identifier reaches the head of the command queue, the identifier is popped when the next command is to be run.

The controller 130 is configured to retrieve a field of the memory request from the entry of the directory data structure using the identifier popped off of the queue. Continuing the example from above, the command type (e.g., a read) can be read from the entry in the directory data structure, the payload, and the address to which the payload will be written can also be retrieved. Using these elements of the memory request, the command execution can proceed without storing the address or payload in the execute command queue. Accordingly, the controller 130 is configured to perform the processing to complete the memory request using the field retrieved from the entry of the directory data structure.

Figure 2:
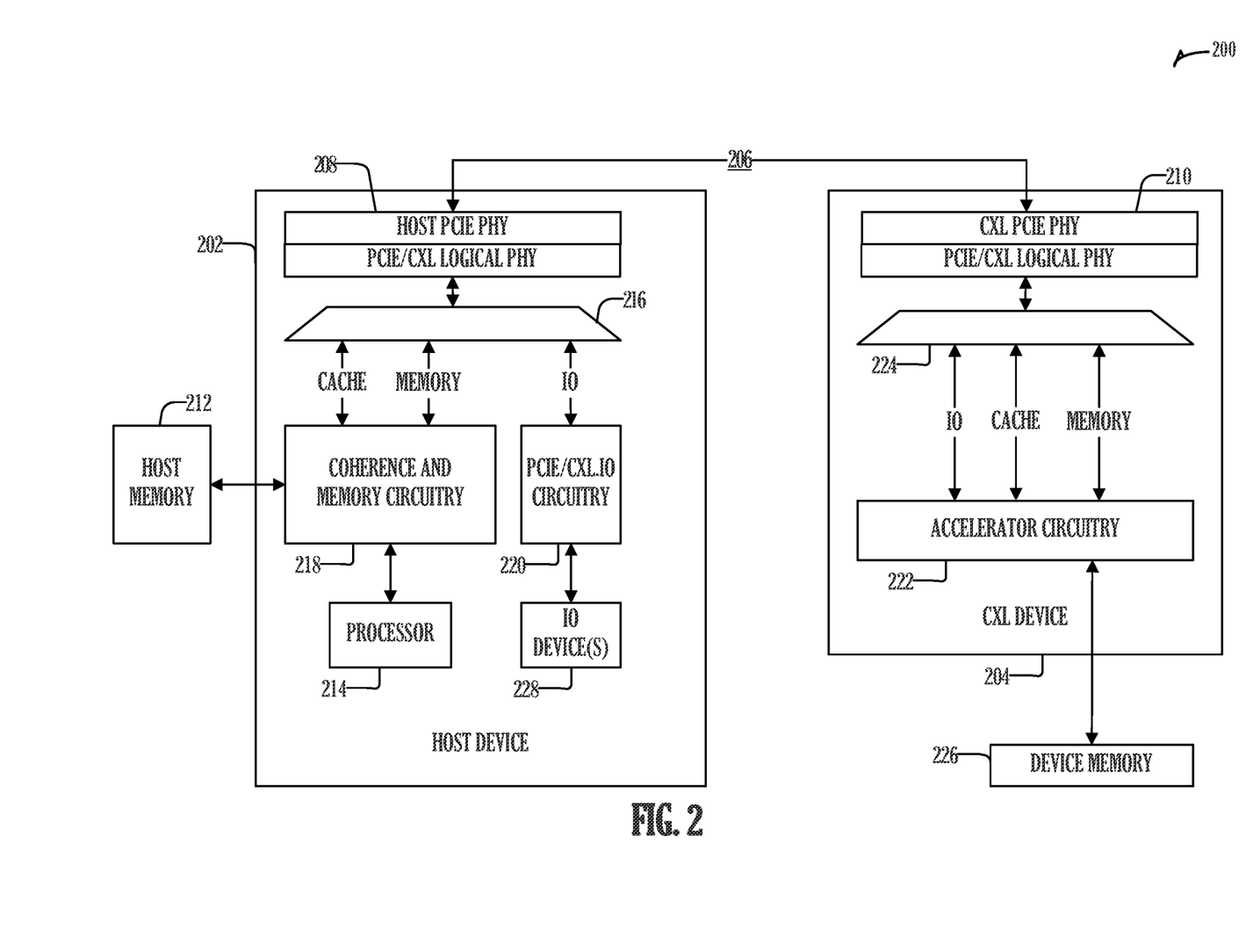
FIG. 2 illustrates an example of a host connected to a CXL device, according to an embodiment.

FIG. 2 illustrates an example of a host connected to a CXL device, according to an embodiment. FIG. 2 illustrates generally an example of a CXL system 200 that uses a CXL link 206 to connect a host device 202 and a CXL device 204 via a host physical layer PCIE interface 208 and a CXL client physical layer PCIE interface 210 respectively. In an example, the host device 202 comprises or corresponds to the host device 105 and the CXL device 204 comprises or corresponds to the memory system 125 from the example of the system in FIG. 1. A memory system command manager can comprise a portion of the host device 202 or the CXL device 204. In an example, the CXL link 206 can support communications using multiplexed protocols for caching (e.g., CXL.cache), memory accesses (e.g., CXL.mem), and data input/output transactions (e.g., CXL.io). CXL.io can include a protocol based on PCIe that is used for functions such as device discovery, configuration, initialization, I/O virtualization, and direct memory access (DMA) using non-coherent load-store, producer-consumer semantics. CXL.cache can enable a device to cache data from the host memory (e.g., from the host memory 212) using a request and response protocol. CXL.memory can enable the host device 202 to use memory attached to the CXL device 204, for example, in or using a virtualized memory space. In an example, CXL.memory transactions can be memory load and store operations that run downstream from or outside of the host device 202.

In the example of FIG. 2, the host device 202 includes a host processor 214 (e.g., comprising one or more CPUs or cores) and IO device(s) 228. The host device 202 can comprise, or can be coupled to, host memory 212. The host device 202 can include various circuitry (e.g., logic) configured to facilitate CXL-based communications and transactions with the CXL device 204. For example, the host device 202 can include coherence and memory circuitry 218 configured to implement transactions according to CXL.cache and CXL.mem semantics, and the host device 202 can include PCIe circuitry 220 configured to implement transactions according to CXL.io semantics. In an example, the host device 202 can be configured to manage coherency of data cached at the CXL device 204 using, e.g., its coherence and memory circuitry 218.

The host device 202 can further include a host multiplexer 216 configured to modulate communications over the CXL link 206 (e.g., using the PCIe PHY layer). The multiplexing of protocols ensures that latency-sensitive protocols (e.g., CXL.cache and CXL.memory) have the same or similar latency as a native processor-to-processor link. In an example, CXL defines an upper bound on response times for latency-sensitive protocols to help ensure that device performance is not adversely impacted by variation in latency between different devices implementing coherency and memory semantics.

In an example, symmetric cache coherency protocols can be difficult to implement between host processors because different architectures can use different solutions, which in turn can compromise backward compatibility. CXL can address this problem by consolidating the coherency function at the host device 202, such as using the coherence and memory circuitry 218.

The CXL device 204 can include an accelerator device that comprises various accelerator circuitry 222. In an example, the CXL device 204 can comprise, or can be coupled to, CXL device memory 226. The CXL device 204 can include various circuitry configured to facilitate CXL-based communications and transactions with the host device 202 using the CXL link 206. For example, the accelerator circuitry 222 can be configured to implement transactions according to CXL.cache, CXL.mem, and CXL.io semantics. The CXL device 204 can include a CXL device multiplexer 224 configured to control communications over the CXL link 206. The accelerator circuitry 222 can be one or more processors that can perform one or more tasks. Accelerator circuitry 222 can be a general purpose processor or a processor designed to accelerate one or more specific workloads.

FIG. 3 illustrates example components of a memory device, according to an embodiment. The illustrated components are part of a memory controller, such as those described above (e.g., the memory controller 130 illustrated in FIG. 1). The illustrated components include elements to address internal (e.g., from a near-memory accelerator) and external (e.g., received from a host via a CXL link) request differences used to maintain CXL protocol requirements.

For example, the illustrated CM pool 310 holds memory requests received from a CXL interface (e.g., an external interface) and the NI pool 315 holds memory requests received from an internal device (e.g., from an accelerator of the memory controller via an intra-chip network or network-on-chip (NOC) interface).

The illustrated request information table 305 maintains the data elements of the request, such as the command (e.g., read, write, atomic operator, etc.), what memory address or addresses are affected, and a payload (e.g., the case of a write). Storing the request information in a central table reduces the amount of data transferred to the various illustrated queues. Such queues include the defer queues 330 for cache sets, response queues 325, and action queues 320. Note that, each of these queues uses the identifier of the request (e.g., request index). Thus, for example, the execute command queue in the action queues 320 can require an address and a payload to execute a write command. When the request index reaches the head of the queue, the controller uses the index to retrieve the address and the payload from the request information table 305 and then execute the command.

FIG. 4 illustrates an example of an associative cache 400, according to an embodiment. Here, the associative cache 400 includes four cache sets, cache set zero 405, cache set one 410, cache set two 415, and cache set three 420. Note that each cache set corresponds to a memory address range. Thus, cache set one corresponds to all memory elements with an address prefixed by 00 while cache set three 415 corresponds to all memory elements with an address prefixed by 10. The cache lines within each cache set represent a storage element (e.g., register) sized for an element in the memory. Each cache line can also be called a "way." Thus, as illustrated, the associated cache 400 is a four-way associative cache because four ways can be used for each cache set. Generally, memory requests with addresses in one cache set will load a way until all of the ways are used. With the arrival of another memory request, a process to evict a way to load the new data can be undertaken to free the way for the new memory request.

The associative cache 400 can maintain metadata for the ways. Thus, as illustrated, the associative cache 400 includes a tag (e.g., metadata) in addition to the way data, resulting in the way zero tag and data 425, the way one tag and data 430, the way two tag and data 435, and the way three tag and data 440. Examples of tag data can include a dirty bit to indicate whether the way is out-of-sync with the backing memory, whether there is an operation to synchronize the way with host memory (e.g., a host recall is underway), or CXL meta-state, request state, among others. In an example, whether the source (e.g., internal or external) of the request impacts operation of the memory controller, the tag data can include designation of whether the request is internal or external as well as, for example, whether the request is internal and deferred, or external and deferred.

The following is an example of a data structure (e.g., C-style struct) to hold tag data that applies to an entire cache set (e.g., not specific to a single way in the cache set):

```
struct MscSet {
    bool            m_bRetryPend;
    uint32_t                            m_evHashMask;
    SimCount                            m_evRecallCnt;
    SimMscReqList                       m_niDeferList;
    SimMscReqList                       m_cmDeferList;
};
```

The following is an example of a data structure (e.g., C-style struct) to hold tag data for a given way in a cache set:

```
struct Msc Way {
    struct Msc WayTag {
        uint64_t            m_addr;
        std::bitset         m_validMask;
        std::bitset         m_dirtyMask;
        std::bitset         m_mBusyMask;
        bool                m_bRetryPend;
        bool                m_bRecallPend;
        uint16_t            m_recallRid;
        MetaState           m_memMetaState;
        MetaState           m_curMetaState;
        SimMscReqList           m_niDeferList;
        SimMscReqList           m_cmDeferList;
    } m_tag;
    uint8_t[64]     m_data;
};
```

FIG. 5 illustrates an example of a memory including a directory 500 for memory requests and cache tags pointing to entries in the directory 500, according to an embodiment. As illustrated, the directory includes entries, such as entry 505 holding a first request, empty entry 510, entry 515 holding a second request, and entry 520 folding an n-th request. Each entry has a corresponding index. In the associative cache 525, cache set 530 stores the index of a request in the way tag as the index. Thus, the first request is using way zero and way zero stores the index for the first request in the tag 535. Similarly, tag 540 contains the index for the second request and tag 545 includes the index for the n-th request.

In an example, as packets are received (e.g., from an ingress port of the controller), a free directory entry is obtained from a pool of free entries. The memory request fields (e.g., taken from a CXL or NOC packet) are written into the directory 500 at the entry obtained from the pool. The entry index is pushed into a queue (e.g., action queue, defer queue, etc.) for later processing. When the request index arrives at a queue head, the request index from the queue head is used to identify the next request to be processed. The request index is used to access the directory 500 and obtain the request information as needed for the current processing. Processing a request can involve multiple passes. The request index can be pushed into a queue for each processing pass.

An alternative configuration of the queue can leverage the request directory entries (e.g., as illustrated in element 330 of FIG. 3). Here, the queue is simply a head pointer into the directory to designate the first request in the queue and a tail pointer into the directory to designate the last request in the queue. The queue, in this example, is a linked-list in which the elements (e.g., directory entries for the requests) point to each other. In a simple implementation, the links are one-way from the head to the tail. Thus, the directory entry for each element in the list links to the next element in the list. To add a new element, the "next element" pointer in the directory entry indicated by the tail pointer is updated to the new entry and the tail pointer is also updated to the new entry. In an example, the linked list can be bi-directional, in which each directory entry has a pointer to a previous element as well as a next element. The queue is traversed by entering the queue using the head pointer, for example, to get to a directory entry. The next element pointer can then be used to get to the next element of the queue. This process can be repeated until the next element pointer is empty, indicating the end of the queue.

Figure 6:
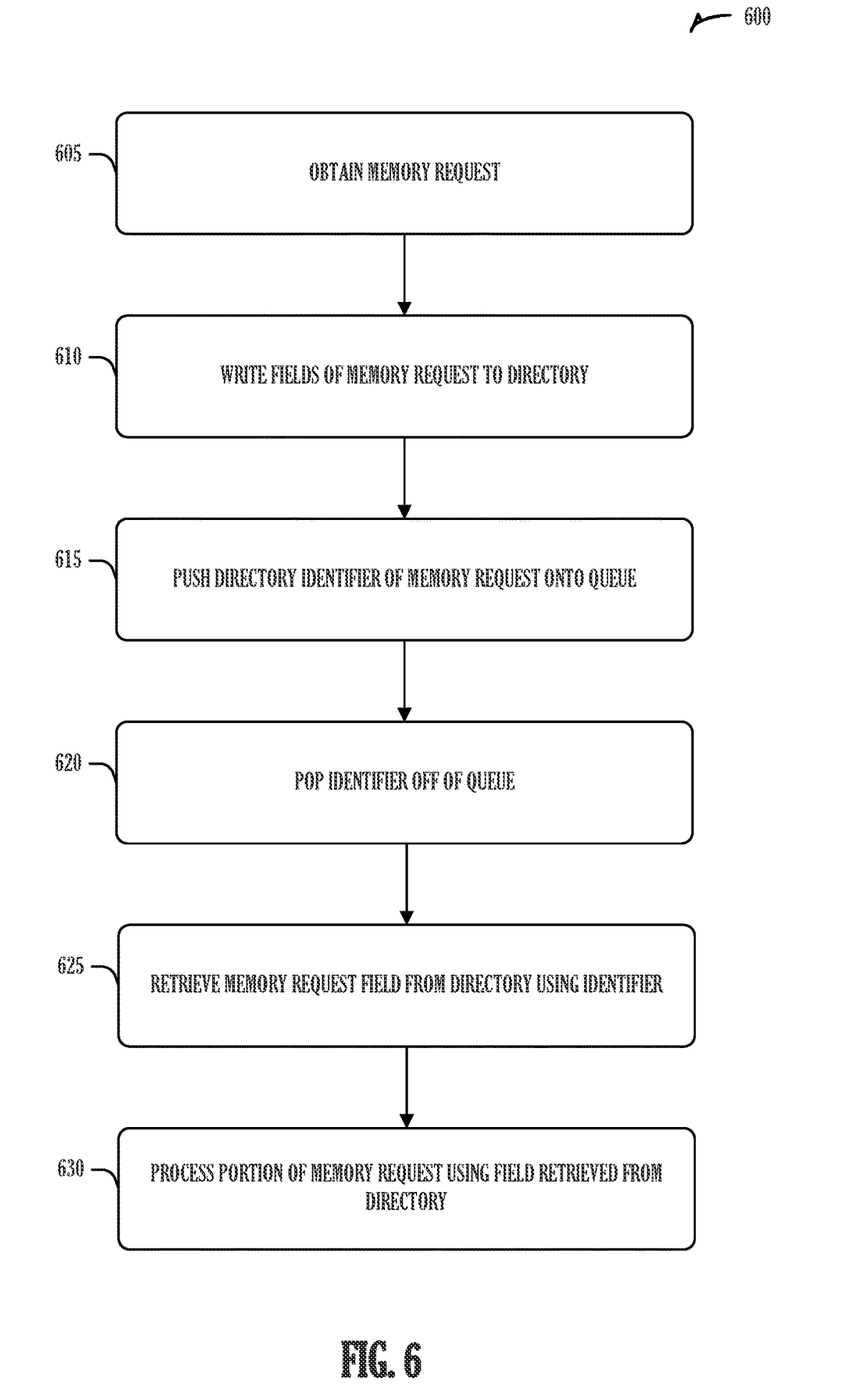
FIG. 6 illustrates a flow diagram of an example of a method for a memory-side cache directory-based request queue, according to an embodiment.

FIG. 6 illustrates a flow diagram of an example of a method 600 for a memory-side cache directory-based request queue, according to an embodiment. The operations of the method 600 are performed by computational hardware, such as that described above or below (e.g., processing circuitry).

At operation 605, a memory request is received (e.g., at an interface of a memory device). In an example, the interface is either an internal interface of the memory device or an external internal interface of the memory device. Here, the internal interface memory requests from components of the memory device are received on the internal interface and memory requests from devices external to the memory device are received on the external interface. In an example, the external interface is a compute express link (CXL) interface. In an example, the internal interface is a network on chip (NOC) interface.

At operation 610, one or more fields of the memory request are written into an entry of a directory data structure. Here, the entry includes an identifier for itself (e.g., the identifier can be reused for different memory requests if the different memory requests are stored in the entry at different points in time). In an example, the directory data structure is associated with the interface. In an example, the memory device has a different directory data structure for each interface of the memory device. In an example, the one or more fields is one or more of an address, a request type, a size, byte enable for a write request, a payload for a write request, atomic data for an atomic operation request, an atomic operation for an atomic operation request, a compute express link (CXL) memory operation, or a CXL meta state.

In an example, the directory data structure is a contiguous memory region divided into equal sized entries. In an example, identifiers of entries in the directory data structure are indices to the entries. In an example, a free list of entries in the directory data structure is maintained. In an example, writing the one or more fields of the memory request into the entry of the directory data structure includes obtaining the entry as a next-free entry from the free list, and removing the entry from the free list of entries in the directory data structure. In an example, the method 600 includes the operations of completing the memory request and clearing the one or more fields from the entry in response to completing the memory request. The entry is then added to the free list of entries in the directory data structure in response to clearing the one or more fields from the entry.

At operation 615, the identifier is pushed onto a queue. In an example, the queue is one of a request queue, a response queue, a defer queue, a priority queue, or a retry queue. In an example, the queue is associated with the interface upon which the request was received (e.g., either the internal interface or the external interface).

At operation 620, the identifier is popped off of the queue to perform a process on the memory request.

Ay operation 625, a field of the memory request is retrieved from the entry of the directory data structure using the identifier popped off of the queue.

At operation 630, the process is performed on the memory request using the field retrieved from the entry of the directory data structure.

In an example, the method 600 further includes the operations of pushing the identifier onto a second queue and popping the identifier off of the second queue to perform a second process on the memory request. Here, the second queue corresponds to the second process. The method 600 can continue by retrieving a second field of the memory request from the entry of the directory data structure using the identifier popped off of the second queue and performing the second process on the memory request using the second field from the entry of the directory data structure.

Figure 7:
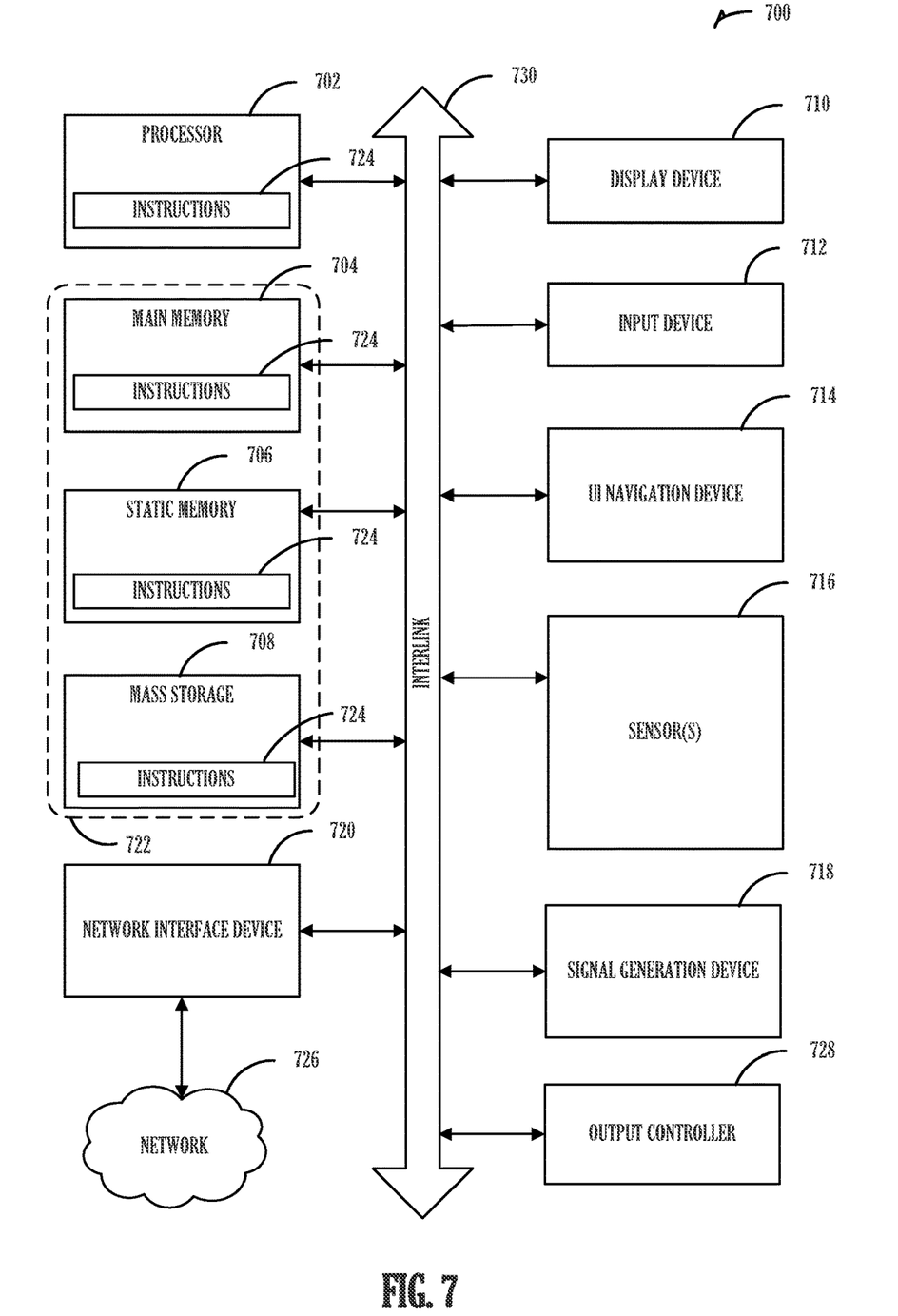
FIG. 7 illustrates an example of a machine with which one or more embodiments can be implemented.

FIG. 7 illustrates a block diagram of an example machine 700 with which any one or more of the techniques (e.g., methodologies) discussed herein can perform. Examples, as described herein, can include, or can operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 700 follow.

In alternative embodiments, the machine 700 can operate as a standalone device or can be connected (e.g., networked) to other machines. In a networked deployment, the machine 700 can operate in the capacity of a server machine, a client machine, or both in server-client network environments. In an example, the machine 700 can act as a peer machine in peer-to-peer (P2P) (or other distributed) network environment. The machine 700 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 700 can include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), unified extensible firmware interface (UEFI), etc.) 706, and mass storage 708 (e.g., hard drives, tape drives, flash storage, or other block devices) some or all of which can communicate with each other via an interlink (e.g., bus) 730. The machine 700 can further include a display unit 710, an alphanumeric input device 712 (e.g., a keyboard), and a user interface (UI) navigation device 714 (e.g., a mouse). In an example, the display unit 710, input device 712 and UI navigation device 714 can be a touch screen display. The machine 700 can additionally include a storage device (e.g., drive unit) 708, a signal generation device 718 (e.g., a speaker), a network interface device 720, and one or more sensors 716, such as a global positioning system (GPS) sensor, compass, accelerometer, or other sensor. The machine 700 can include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 702, the main memory 704, the static memory 706, or the mass storage 708 can be, or include, a machine readable medium 722 on which is stored one or more sets of data structures or instructions 724 (e.g., software) embodying or utilized by any one or more of the techniques or functions described herein. The instructions 724 can also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 can constitute the machine readable media 722. While the machine readable medium 722 is illustrated as a single medium, the term "machine readable medium" can include a single medium or multiple media (e.g., a centralized or distributed database, or associated caches and servers) configured to store the one or more instructions 724.

The term "machine readable medium" can include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 722 can be representative of the instructions 724, such as instructions 724 themselves or a format from which the instructions 724 can be derived. This format from which the instructions 724 can be derived can include source code, encoded instructions (e.g., in compressed or encrypted form), packaged instructions (e.g., split into multiple packages), or the like. The information representative of the instructions 724 in the machine readable medium 722 can be processed by processing circuitry into the instructions to implement any of the operations discussed herein. For example, deriving the instructions 724 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 724.

In an example, the derivation of the instructions 724 can include assembly, compilation, or interpretation of the information (e.g., by the processing circuitry) to create the instructions 724 from some intermediate or preprocessed format provided by the machine readable medium 722. The information, when provided in multiple parts, can be combined, unpacked, and modified to create the instructions 724. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 724 can be further transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 720 can include one or more physical jacks (e.g., Ethernet, coaxial, or phone jacks) or one or more antennas to connect to the communications network 726. In an example, the network interface device 720 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine readable medium.

ADDITIONAL NOTES & EXAMPLES

Example 1 is an apparatus for a memory-side cache directory-based request queue, the apparatus comprising: an interface to receive a request; a memory to store a directory data structure; and processing circuitry configured to: receive, via the interface, a memory request; write one or more fields of the memory request into an entry of the directory data structure, the entry including an identifier; push the identifier onto a queue; pop the identifier off of the queue to perform a process on the memory request; retrieve a field of the memory request from the entry of the directory data structure using the identifier popped off of the queue; and perform the process on the memory request using the field retrieved from the entry of the directory data structure.

In Example 2, the subject matter of Example 1, wherein the directory data structure is a contiguous memory region divided into equal sized entries.

In Example 3, the subject matter of Example 2, wherein identifiers of entries in the directory data structure are indices to the entries.

In Example 4, the subject matter of any of Examples 2-3, wherein the processing circuitry is configured to maintain a free list of entries in the directory data structure.

In Example 5, the subject matter of Example 4, wherein, to write the one or more fields of the memory request into the entry of the directory data structure, the processing circuitry is configured to: obtain the entry as a next-free entry from the free list; and remove the entry from the free list of entries in the directory data structure.

In Example 6, the subject matter of any of Examples 4-5, wherein the processing circuitry is configured to: complete the memory request; clear the one of more fields from the entry in response to completing the memory request; and add the entry to the free list of entries in the directory data structure in response to clearing the one of more fields from the entry.

In Example 7, the subject matter of any of Examples 1-6, wherein the processing circuitry is configured to: push the identifier onto a second queue; pop the identifier off of the second queue to perform a second process on the memory request, the second queue corresponding to the second process; retrieve a second field of the memory request from the entry of the directory data structure using the identifier popped off of the second queue; and perform the second process on the memory request using the second field from the entry of the directory data structure.

In Example 8, the subject matter of any of Examples 1-7, wherein the queue is a request queue, a response queue, a defer queue, a priority queue, or a retry queue.

In Example 9, the subject matter of any of Examples 1-8, wherein the interface is one of an internal interface of the apparatus or an external internal interface of the apparatus, wherein the internal interface is configured to receive memory requests from components of the apparatus, and wherein the external interface is configured to receive memory requests from a device external to the apparatus.

In Example 10, the subject matter of Example 9, wherein the external interface is a compute express link (CXL) interface.

In Example 11, the subject matter of any of Examples 9-10, wherein the internal interface is a network on chip (NOC) interface.

In Example 12, the subject matter of any of Examples 9-11, wherein the queue is associated with the interface.

In Example 13, the subject matter of any of Examples 9-12, wherein the directory data structure is associated with the interface, the apparatus including a corresponding directory data structure for each interface of the apparatus.

In Example 14, the subject matter of any of Examples 1-13, wherein the one or more fields include an address, a request type, a size, byte enable for a write request, a payload for a write request, atomic data for an atomic operation request, an atomic operation for an atomic operation request, a compute express link (CXL) memory operation, or a CXL meta state.

Example 15 is a method for a memory-side cache directory-based request queue, the method comprising: receiving, at an interface of a memory device, a memory request; writing one or more fields of the memory request into an entry of a directory data structure, the entry including an identifier; pushing the identifier onto a queue; popping the identifier off of the queue to perform a process on the memory request; retrieving a field of the memory request from the entry of the directory data structure using the identifier popped off of the queue; and performing the process on the memory request using the field retrieved from the entry of the directory data structure.

In Example 16, the subject matter of Example 15, wherein the directory data structure is a contiguous memory region divided into equal sized entries.

In Example 17, the subject matter of Example 16, wherein identifiers of entries in the directory data structure are indices to the entries.

In Example 18, the subject matter of any of Examples 16-17, comprising maintaining a free list of entries in the directory data structure.

In Example 19, the subject matter of Example 18, wherein writing the one or more fields of the memory request into the entry of the directory data structure includes: obtaining the entry as a next-free entry from the free list; and removing the entry from the free list of entries in the directory data structure.

In Example 20, the subject matter of any of Examples 18-19, comprising: completing the memory request; clearing the one of more fields from the entry in response to completing the memory request; and adding the entry to the free list of entries in the directory data structure in response to clearing the one of more fields from the entry.

In Example 21, the subject matter of any of Examples 15-20, comprising: pushing the identifier onto a second queue; popping the identifier off of the second queue to perform a second process on the memory request, the second queue corresponding to the second process; retrieving a second field of the memory request from the entry of the directory data structure using the identifier popped off of the second queue; and performing the second process on the memory request using the second field from the entry of the directory data structure.

In Example 22, the subject matter of any of Examples 15-21, queue, or a retry queue.

In Example 23, the subject matter of any of Examples 15-22, wherein the interface is one of an internal interface of the memory device or an external internal interface of the memory device, wherein the internal interface is configured to receive memory requests from components of the memory device, and wherein the external interface is configured to receive memory requests from a device external to the memory device.

In Example 24, the subject matter of Example 23, wherein the external interface is a compute express link (CXL) interface.

In Example 25, the subject matter of any of Examples 23-24, wherein the internal interface is a network on chip (NOC) interface.

In Example 26, the subject matter of any of Examples 23-25, wherein the queue is associated with the interface.

In Example 27, the subject matter of any of Examples 23-26, wherein the directory data structure is associated with the interface, the memory device including a corresponding directory data structure for each interface of the memory device.

In Example 28, the subject matter of any of Examples 15-27, wherein the one or more fields include an address, a request type, a size, byte enable for a write request, a payload for a write request, atomic data for an atomic operation request, an atomic operation for an atomic operation request, a compute express link (CXL) memory operation, or a CXL meta state.

Example 29 is a machine readable medium including instructions for a memory-side cache directory-based request queue, the instructions, when executed by processing circuitry, cause the processing circuitry to perform operations comprising: receiving, at an interface of a memory device, a memory request; writing one or more fields of the memory request into an entry of a directory data structure, the entry including an identifier; pushing the identifier onto a queue; popping the identifier off of the queue to perform a process on the memory request; retrieving a field of the memory request from the entry of the directory data structure using the identifier popped off of the queue; and performing the process on the memory request using the field retrieved from the entry of the directory data structure.

In Example 30, the subject matter of Example 29, wherein the directory data structure is a contiguous memory region divided into equal sized entries.

In Example 31, the subject matter of Example 30, wherein identifiers of entries in the directory data structure are indices to the entries.

In Example 32, the subject matter of any of Examples 30-31, wherein the operations comprise maintaining a free list of entries in the directory data structure.

In Example 33, the subject matter of Example 32, wherein writing the one or more fields of the memory request into the entry of the directory data structure includes: obtaining the entry as a next-free entry from the free list; and removing the entry from the free list of entries in the directory data structure.

In Example 34, the subject matter of any of Examples 32-33, wherein the operations comprise: completing the memory request; clearing the one of more fields from the entry in response to completing the memory request; and adding the entry to the free list of entries in the directory data structure in response to clearing the one of more fields from the entry.

In Example 35, the subject matter of any of Examples 29-34, wherein the operations comprise: pushing the identifier onto a second queue; popping the identifier off of the second queue to perform a second process on the memory request, the second queue corresponding to the second process; retrieving a second field of the memory request from the entry of the directory data structure using the identifier popped off of the second queue; and performing the second process on the memory request using the second field from the entry of the directory data structure.

In Example 36, the subject matter of any of Examples 29-35, queue, or a retry queue.

In Example 37, the subject matter of any of Examples 29-36, wherein the interface is one of an internal interface of the memory device or an external internal interface of the memory device, wherein the internal interface is configured to receive memory requests from components of the memory device, and wherein the external interface is configured to receive memory requests from a device external to the memory device.

In Example 38, the subject matter of Example 37, wherein the external interface is a compute express link (CXL) interface.

In Example 39, the subject matter of any of Examples 37-38, wherein the internal interface is a network on chip (NOC) interface.

In Example 40, the subject matter of any of Examples 37-39, wherein the queue is associated with the interface.

In Example 41, the subject matter of any of Examples 37-40, wherein the directory data structure is associated with the interface, the memory device including a corresponding directory data structure for each interface of the memory device.

In Example 42, the subject matter of any of Examples 29-41, wherein the one or more fields include an address, a request type, a size, byte enable for a write request, a payload for a write request, atomic data for an atomic operation request, an atomic operation for an atomic operation request, a compute express link (CXL) memory operation, or a CXL meta state.

Example 43 is a system for a memory-side cache directory-based request queue, the system comprising: means for receiving, at an interface of a memory device, a memory request; means for writing one or more fields of the memory request into an entry of a directory data structure, the entry including an identifier; means for pushing the identifier onto a queue; means for popping the identifier off of the queue to perform a process on the memory request; means for retrieving a field of the memory request from the entry of the directory data structure using the identifier popped off of the queue; and means for performing the process on the memory request using the field retrieved from the entry of the directory data structure.

In Example 44, the subject matter of Example 43, wherein the directory data structure is a contiguous memory region divided into equal sized entries.

In Example 45, the subject matter of Example 44, wherein identifiers of entries in the directory data structure are indices to the entries.

In Example 46, the subject matter of any of Examples 44-45, comprising means for maintaining a free list of entries in the directory data structure.

In Example 47, the subject matter of Example 46, wherein the means for writing the one or more fields of the memory request into the entry of the directory data structure include: means for obtaining the entry as a next-free entry from the free list; and means for removing the entry from the free list of entries in the directory data structure.

In Example 48, the subject matter of any of Examples 46-47, comprising: means for completing the memory request; means for clearing the one of more fields from the entry in response to completing the memory request; and means for adding the entry to the free list of entries in the directory data structure in response to clearing the one of more fields from the entry.

In Example 49, the subject matter of any of Examples 43-48, comprising: means for pushing the identifier onto a second queue; means for popping the identifier off of the second queue to perform a second process on the memory request, the second queue corresponding to the second process; means for retrieving a second field of the memory request from the entry of the directory data structure using the identifier popped off of the second queue; and means for performing the second process on the memory request using the second field from the entry of the directory data structure.

In Example 50, the subject matter of any of Examples 43-49, queue, or a retry queue.

In Example 51, the subject matter of any of Examples 43-50, wherein the interface is one of an internal interface of the memory device or an external internal interface of the memory device, wherein the internal interface is configured to receive memory requests from components of the memory device, and wherein the external interface is configured to receive memory requests from a device external to the memory device.

In Example 52, the subject matter of Example 51, wherein the external interface is a compute express link (CXL) interface.

In Example 53, the subject matter of any of Examples 51-52, wherein the internal interface is a network on chip (NOC) interface.

In Example 54, the subject matter of any of Examples 51-53, wherein the queue is associated with the interface.

In Example 55, the subject matter of any of Examples 51-54, wherein the directory data structure is associated with the interface, the memory device including a corresponding directory data structure for each interface of the memory device.

In Example 56, the subject matter of any of Examples 43-55, wherein the one or more fields include an address, a request type, a size, byte enable for a write request, a payload for a write request, atomic data for an atomic operation request, an atomic operation for an atomic operation request, a compute express link (CXL) memory operation, or a CXL meta state.

Example 57 is at least one machine-readable medium including instructions that, when executed by processing circuitry, cause the processing circuitry to perform operations to implement of any of Examples 1-56.

Example 58 is an apparatus comprising means to implement of any of Examples 1-56.

Example 59 is a system to implement of any of Examples 1-56.

Example 60 is a method to implement of any of Examples 1-56.

The above detailed description includes references to the accompanying drawings, which form a part of the detailed description. The drawings show, by way of illustration, specific embodiments that can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is to enable the reader to quickly ascertain the nature of the technical disclosure and is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. An apparatus comprising:
   an interface to receive a request;
   a memory to store a directory data structure; and
   processing circuitry configured to:
     receive, via the interface, a memory request;
     write one or more fields of the memory request into an entry of the directory data structure, the entry including an identifier;
     push the identifier onto a queue;
     pop the identifier off of the queue to perform a process on the memory request;
     retrieve a field of the memory request from the entry of the directory data structure using the identifier popped off of the queue; and
     perform the process on the memory request using the field retrieved from the entry of the directory data structure.

2. The apparatus of claim 1, wherein the directory data structure is a contiguous memory region divided into equal sized entries.

3. The apparatus of claim 2, wherein identifiers of entries in the directory data structure are indices to the entries.

4. The apparatus of claim 2, wherein the processing circuitry is configured to maintain a free list of entries in the directory data structure.

5. The apparatus of claim 4, wherein, to write the one or more fields of the memory request into the entry of the directory data structure, the processing circuitry is configured to:
   obtain the entry as a next-free entry from the free list; and
   remove the entry from the free list of entries in the directory data structure.

6. The apparatus of claim 4, wherein the processing circuitry is configured to:
   complete the memory request;
   clear the one of more fields from the entry in response to completing the memory request; and
   add the entry to the free list of entries in the directory data structure in response to clearing the one of more fields from the entry.

7. The apparatus of claim 1, wherein the processing circuitry is configured to:
   push the identifier onto a second queue;
   pop the identifier off of the second queue to perform a second process on the memory request, the second queue corresponding to the second process;
   retrieve a second field of the memory request from the entry of the directory data structure using the identifier popped off of the second queue; and
   perform the second process on the memory request using the second field from the entry of the directory data structure.

8. The apparatus of claim 1, wherein the interface is one of an internal interface of the apparatus or an external internal interface of the apparatus, wherein the internal interface is configured to receive memory requests from components of the apparatus, and wherein the external interface is configured to receive memory requests from a device external to the apparatus.

9. A method comprising:
   receiving, at an interface of a memory device, a memory request;
   writing one or more fields of the memory request into an entry of a directory data structure, the entry including an identifier;
   pushing the identifier onto a queue;
   popping the identifier off of the queue to perform a process on the memory request;
   retrieving a field of the memory request from the entry of the directory data structure using the identifier popped off of the queue; and
   performing the process on the memory request using the field retrieved from the entry of the directory data structure.

10. The method of claim 9, wherein the directory data structure is a contiguous memory region divided into equal sized entries.

11. The method of claim 10, wherein identifiers of entries in the directory data structure are indices to the entries.

12. The method of claim 10, comprising maintaining a free list of entries in the directory data structure.

13. The method of claim 12, wherein writing the one or more fields of the memory request into the entry of the directory data structure includes:
   obtaining the entry as a next-free entry from the free list; and
   removing the entry from the free list of entries in the directory data structure.

14. The method of claim 12, comprising:
   completing the memory request;
   clearing the one of more fields from the entry in response to completing the memory request; and
   adding the entry to the free list of entries in the directory data structure in response to clearing the one of more fields from the entry.

15. The method of claim 9, comprising:
   pushing the identifier onto a second queue;
   popping the identifier off of the second queue to perform a second process on the memory request, the second queue corresponding to the second process;
   retrieving a second field of the memory request from the entry of the directory data structure using the identifier popped off of the second queue; and performing the second process on the memory request using the second field from the entry of the directory data structure.

16. The method of claim 9, wherein the interface is one of an internal interface of the memory device or an external internal interface of the memory device, wherein the internal interface is configured to receive memory requests from components of the memory device, and wherein the external interface is configured to receive memory requests from a device external to the memory device.

17. A non-transitory machine readable medium including instructions that, when executed by processing circuitry, cause the processing circuitry to perform operations comprising:
 receiving, at an interface of a memory device, a memory request;
 writing one or more fields of the memory request into an entry of a directory data structure, the entry including an identifier;
 pushing the identifier onto a queue;
 popping the identifier off of the queue to perform a process on the memory request;
 retrieving a field of the memory request from the entry of the directory data structure using the identifier popped off of the queue; and
 performing the process on the memory request using the field retrieved from the entry of the directory data structure.

18. The non-transitory machine readable medium of claim 17, wherein the directory data structure is a contiguous memory region divided into equal sized entries.

19. The non-transitory machine readable medium of claim 18, wherein identifiers of entries in the directory data structure are indices to the entries.

20. The non-transitory machine readable medium of claim 18, wherein the operations comprise maintaining a free list of entries in the directory data structure.

21. The non-transitory machine readable medium of claim 20, wherein writing the one or more fields of the memory request into the entry of the directory data structure includes:
 obtaining the entry as a next-free entry from the free list; and
 removing the entry from the free list of entries in the directory data structure.

22. The non-transitory machine readable medium of claim 20, wherein the operations comprise:
 completing the memory request;
 clearing the one of more fields from the entry in response to completing the memory request; and
 adding the entry to the free list of entries in the directory data structure in response to clearing the one of more fields from the entry.

23. The non-transitory machine readable medium of claim 17, wherein the operations comprise:
 pushing the identifier onto a second queue;
 popping the identifier off of the second queue to perform a second process on the memory request, the second queue corresponding to the second process;
 retrieving a second field of the memory request from the entry of the directory data structure using the identifier popped off of the second queue; and
 performing the second process on the memory request using the second field from the entry of the directory data structure.

24. The non-transitory machine readable medium of claim 17, wherein the interface is one of an internal interface of the memory device or an external internal interface of the memory device, wherein the internal interface is configured to receive memory requests from components of the memory device, and wherein the external interface is configured to receive memory requests from a device external to the memory device.

* * * * *